(12) United States Patent
Scott

(10) Patent No.: US 7,293,399 B2
(45) Date of Patent: Nov. 13, 2007

(54) HIGH PRESSURE FOLIAGE REMOVER

(76) Inventor: Phillip Ray Scott, 29486 Corral Ct. North, Coarsegold, CA (US) 93614

( * ) Notice: Subject to any disclaimer, the term of this patent is extended or adjusted under 35 U.S.C. 154(b) by 55 days.

(21) Appl. No.: 11/201,708

(22) Filed: Aug. 11, 2005

(65) Prior Publication Data
US 2007/0033914 A1 Feb. 15, 2007

(51) Int. Cl.
*A01D 46/28* (2006.01)
(52) U.S. Cl. .................. 56/16.8; 56/10.2 E; 56/121.42; 56/330; 30/123.3; 47/1.43
(58) Field of Classification Search ............ 56/10.2 E, 56/16.8, 121.41, 121.42, 330; 30/123.3
See application file for complete search history.

(56) References Cited

U.S. PATENT DOCUMENTS

| 3,563,016 | A | * | 2/1971 | Tolochko et al. ............. 56/331 |
| 4,168,798 | A | * | 9/1979 | Moore et al. ................ 239/121 |
| 4,255,922 | A | * | 3/1981 | Hiyama et al. ............... 56/330 |
| 5,689,944 | A | * | 11/1997 | Mirosevic .................... 56/16.8 |
| 5,842,307 | A | * | 12/1998 | May ............................ 47/1.7 |
| 2003/0154702 | A1 | * | 8/2003 | Castleberry ...................... 56/8 |

* cited by examiner

*Primary Examiner*—Thomas B. Will
*Assistant Examiner*—Mai T Nguyen
(74) *Attorney, Agent, or Firm*—Henry M. Stanley

(57) ABSTRACT

A system for performing several functions in caring for crops such as vines grown in rows uses a high pressure water jet to selectively prune, thin shoots and remove leaves from growing crops. Water jet size, pressure, movement and position relative to the crops are controlled to obtain desired functions.

20 Claims, 6 Drawing Sheets

HIGH PRESSURE FOLIAGE REMOVER

BACKGROUND OF THE INVENTION

The field of this invention relates to foliage removal in growing crops, specifically pruning, shoot removal, and leaf removal in vine grown crops such as grapes.

There have been numerous attempts in the past to mechanize the task of pruning grape vines. Grape vines characteristically are hand pruned. All known attempts to this point in time to mechanize pruning have involved the use of mechanical cutting means, such as oscillating sickle cutters or rotary saw blades. Most modern vineyards are trellised, which means that there are steel stakes placed in the ground next to the vine with wires stretched down the row of steel stakes. Typically, there is a stake every five to seven feet along the row and the row may be as much as a quarter of a mile long. The wires are attached from stake to adjacent stake making an array similar to a fence running in the "down the row" direction. The grape vines are trained up the stake to the wire and then cordoned up and down the wire in the direction of the row. These stakes and wires are necessary to support the grape vine and its foliage as well as the crop the vine produces. The trellising of grapes has been an important step in making the mechanical harvesting of grapes possible. The trellising is also important in making the mechanized pruning of grape vines possible.

As mentioned hereinbefore, the current styles of mechanized pruning all share the common means of "cutting" by either impact or shear. The cutting motion is created by either a reciprocating motion in the case of sickle teeth, or by a rotary motion in the case of saw blades and the like. With either of these methods of cutting, there can be a problem with the cutting device getting tangled up in the steel stakes or trellis wires. When this occurs damage can be extensive to the pruning equipment as well as to the stake array and the trellising wire. Often along such trellised rows a leaning stake or a broken wire may be encountered which enter into the path of the pruning cutters. Cutters positioned above the cordon as they move along the row must be tripped and withdrawn from the row to keep from contacting a stake. When the cutter is kicked away from the row to bypass a stake and then reinserted into the row as the cutter passes the stake there then exists a sizable length of the vine row that does not get pruned.

The mechanical cutting devices share common problems. They usually have a large number of moving parts, are expensive to maintain and often require removal of the cutting edges and re-sharpening before proceeding with the pruning operation. Mechanical cutters also have the potential of tangling with the trellising wires, and can consequently tear vines out of the row as well as causing the aforementioned extensive damage to the cutting machinery.

The cut in the vine wood needs to be clean and smooth. If the mechanical cutting device is dull, the effect is to bludgeon the wood until it breaks. The result is to shatter the cane, causing it to die back several inches from the shattered portion. This shattered cane wood also provides a home for vineyard pests and diseases. If a vineyard is infected with a spore type of disease, the disease can be carried to the next vineyard due to contamination carried by the cutting blades. Furthermore, with the high speed of the rotary type of cutters, such as the rotating saw blades and rotary lawnmower blade configurations, there is a safety concern. With these types of cutters there is always flying debris, and personnel other than the protected operator must be required to remain several hundred feet away from the machinery during operation.

There are times when just prior to full maturity of the grapes the winemakers and/or growers want to remove leaves from the fruiting area of the vine to allow sunlight to get into the fruit so as to gain additional color in the grape bunches. To remove these by hand can be expensive and time-consuming. Some of the attempts to mechanize leaf removal have been to use vacuum type devices to suck the leaves into a rotary cutter which chews them up. Another device that has been tried in the past uses high pressure blasts of air to basically shred the leaf into fragments. These attempts at leaf removal have been only partially successful at best, and have been costly to operate. Moreover, this type of equipment is "single purpose" only, thereby serving its purpose for a very short period of time during each growing season and being relegated to storage thereafter.

In high quality grape growing areas there are times when the wineries that buy the grapes from the growers request or demand that only a given amount of grapes be produced per vine. The theory is that the vine will produce a better quality grape if the vine is not loaded with as much crop as it can naturally produce. To accomplish this, the growers must go into the field and do shoot thinning. Shoot thinning is the process of cutting off a number of shoots growing out of the cordon, which in turn reduces the amount of fruit bearing wood left on the vine. Shoot thinning is normally done by hand. There have been some attempts to mechanize shoot thinning by striking the vine with nylon or fiberglass rods in a side to side motion to break off some of the shoots. This mechanical approach can be more damaging than intended to the vine. Beating the vines hard enough to break off some shoots may be damaging other shoots microscopically, and damage is difficult to predict and therefore avoid. This is not a very successful method, due to lack of control of the amount of breakage and damage to the vine.

SUMMARY OF THE INVENTION

A water jet foliage removal system is used for treating the foliage in growing crops. The system includes a water reservoir, a high pressure pump connected to the water reservoir, a restricted orifice nozzle and means connected between the high pressure pump and the restricted orifice nozzle. A carrier is provided for mounting the restricted orifice nozzle and for moving it over an underlying surface to position it adjacent to a portion of the growing crop.

A high pressure foliage removal system is provided for row grown crops having a mobile transport, a water reservoir mounted on the mobile transport, a high pressure pump mounted on the mobile transport and connected to the water reservoir and a row follower device attached to the mobile transport. The row follower contains structure for contacting opposing sides of the row grown crop and for guiding the row follower substantially along the centerline of the row grown crop. A restricted orifice nozzle is mounted on the row follower structure and a conduit extends between the high pressure pump and the restricted orifice nozzle, so that a high pressure stream of water is emitted from the restricted orifice.

A method is provided for removing foliage in a row growing crop, wherein a source of water is provided and the water is pressurized. Further steps provide connecting the pressurized water to a nozzle and restricting the nozzle aperture to provide a restricted high pressure stream of water. Additional steps include placing the nozzle in proximity to the foliage being removed and directing the high pressure stream toward the foliage.

DESCRIPTION OF THE PREFERRED EMBODIMENTS

The invention disclosed herein uses a high pressure water jet to remove unwanted foliage from crops such as row-grown crops found in a grape vineyard. High pressure water flow, in the range of 10,000 to 40,000 psi, forced through a restricted nozzle, in the range of 0.0025 to 0.050 inches, creates an effective cutting device that eliminates the disadvantages recited in the Background portion of this specification. Cutting of material using high pressure water jets is known for cutting such things as cloth, meat, wood, stone and steel plate (among others). Nozzle and nozzle aperture dimensions and water pressure requirements vary depending on the separation distance between the object to be cut and the nozzle. The thickness and hardness of the wood in the crop to be cut must be considered as well as the relationship between the crop and the forward movement or ground speed along the crop row of the jet. In the instant invention the pressure of the water and the nozzle aperture and subsequent diameter of the water jet are set to cut the vine wood but not high enough to cut the steel stakes or wire that comprise the trellising system for the vines. The high pressure water cutting jet utilized as the cutting device can be left on at all times as the jet is traversed down the crop row and simply bounces off of the row support stakes and any trellising wires the jet contacts. There is no dulling of cutting surfaces or damage imposed on the trellising system by contact with the water jet.

Shoot thinning, to produce a higher quality of grapes while diminishing the quantity of grapes, is performed with the present invention by interrupting the water jet stream for periods as the water jet is traversed down the crop row by allowing the jet to contact and remove shoots for a short length of the row and to then shield shoots for a subsequent short length of the row. Thus, coordination between the time of the interruption of the water jet stream and the speed of the jet travel down the crop row produces a predetermined percentage of shoot removal and crop reduction on the vines.

Leaf removal from the vines allows additional sunlight to get into the foliage and contact the grape bunches. The present invention accomplishes leaf thinning by reducing the pressure in the water jet, increasing the distance between the water jet aperture and the leaves in the vine row and by moving the water jet through a predetermined two dimensional pattern adjacent to the foliage as the high pressure water jet cutting system is traversed along the vine row.

Figure 5:
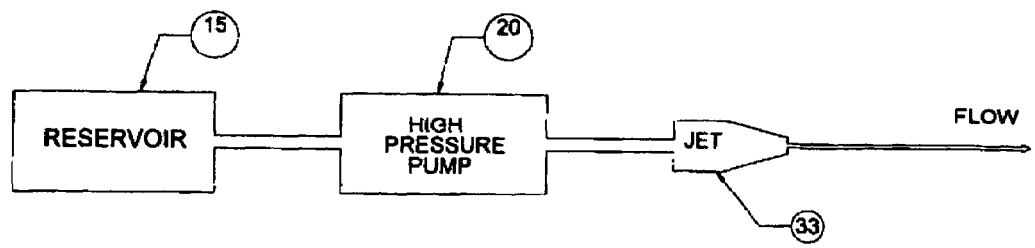
FIG. 5 is a diagram of a rudimentary high pressure water flow system.

One mode of accomplishing the foregoing foliage treatments is to mount a water reservoir and a water pump connected to a pump driving engine on a trailer. The trailer is towed behind a standard farm tractor to travel down the vine row. Another mode for transporting the foliage remover of the present invention along a vineyard row involves an over-the-row grape harvester that has had the harvesting module removed or stripped from it. The high pressure water jet unit is then mounted on the harvester rather than towed so that it may be moved along the vine row. Additionally, if the farm tractor or over-the-row grape harvester has sufficient horsepower in the engine contained therein the high pressure pump may then be mechanically or hydraulically powered by the harvester or tractor engine. A system such as that shown in FIG. 5 is appropriate and may be carried by the transport means. FIG. 5 is a block diagram of a system carried on a tractor or harvester including a reservoir 15 for holding a water supply, a high pressure pump 20 connected to the water reservoir and a water jet nozzle 33 for providing a high pressure water stream flow directed toward the vine row for purposes to be hereinafter described. A water jet pump appropriate for use in the invention disclosed herein is shown in the Model 40201D water jet system manufactured by NLB Corporation of Wixom, Mich.

Figure 1:
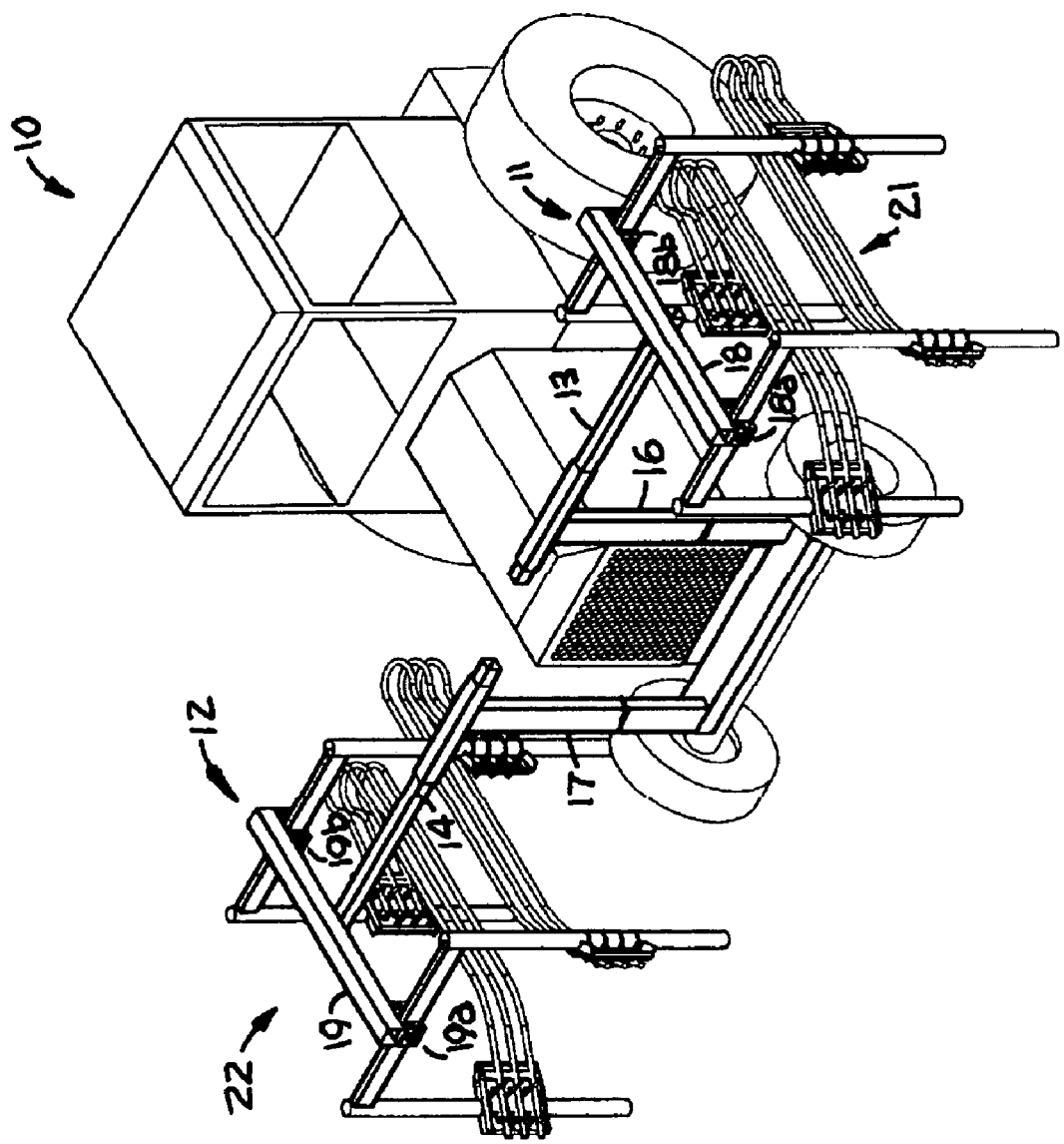
FIG. 1 is a perspective of a mobile carrier having row follower structure mounted thereon.

Referring to FIG. 1 of the drawings, a tractor 10 has left and right pivoting yokes 11 and 12 mounted thereon that may be moved laterally on horizontal telescoping arms 13 and 14 respectively. The yokes are also adjustable in height on telescoping arms 16 and 17 respectively. The telescoping arms 13, 14, 16 and 17 are electrically or hydraulically actuated depending on availability in the tractor 10. The telescoping arms 13, 14, 16 and 17 may also include position sensors to provide position data that may be fed back to the actuators to provide lateral and vertical closed loop control. The left and right pivoting yokes have center beams 18 and 19, respectively, with front and rear pivot points 18a and 18b on the left center beam and 19a and 19b on the right center beam. The center beams 18 and 19 carry in pivotal fashion a left row follower assembly 21 and a right row follower assembly 22 as seen in FIG. 1.

Figure 2:
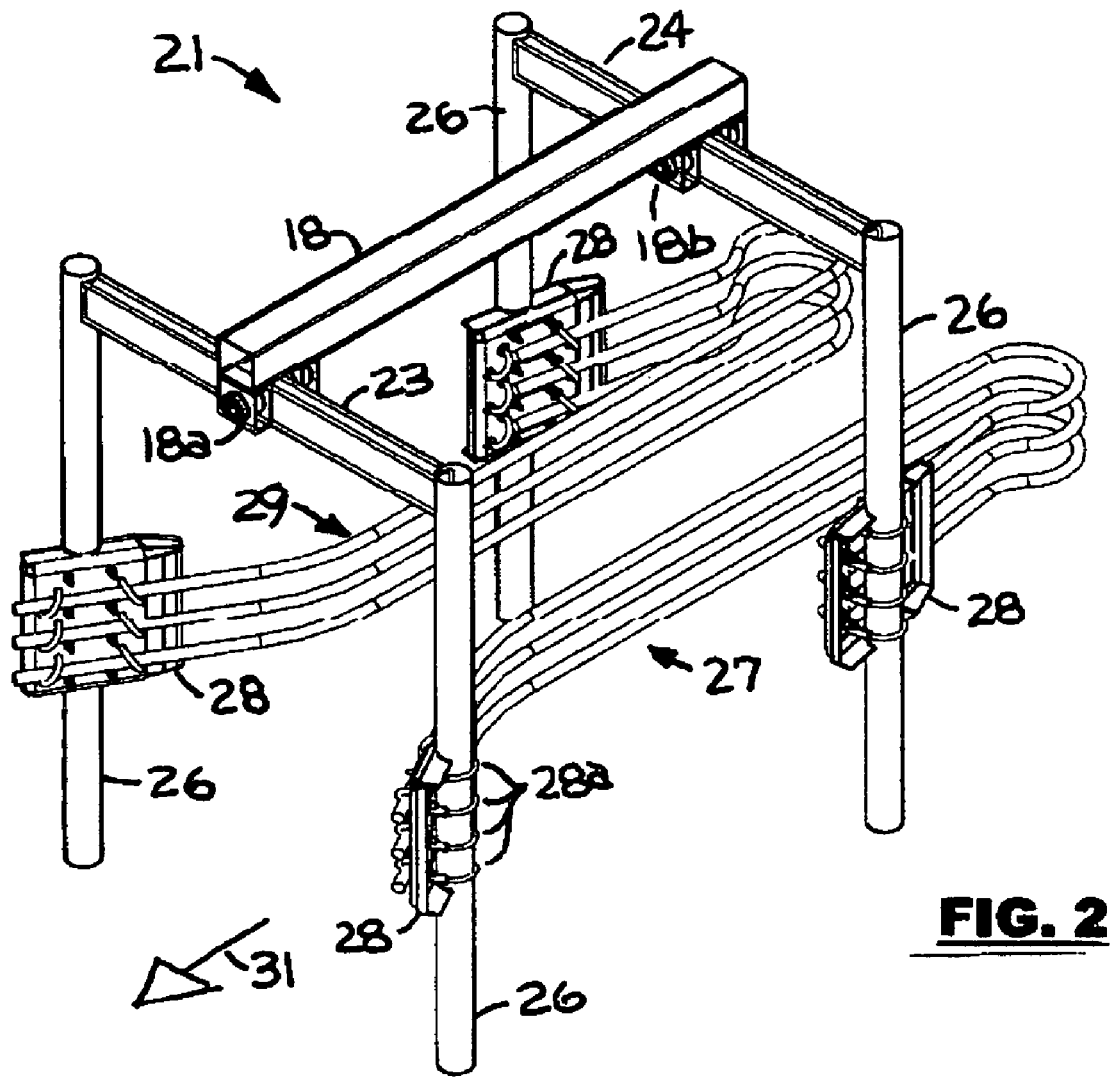
FIG. 2 is a perspective of a row follower structure seen in FIG. 1.

The tractor 10 of FIG. 1 may carry one or two of the row followers seen in FIG. 2, the distance between the two row followers being adjusted to accommodate the distance between adjacent rows in a grape vineyard. Row follower 21 is depicted in FIG. 2, item numbers assigned to the row follower of FIG. 2 having similar structural parts to perform similar functions in the row follower 22 of FIG. 1. FIG. 2 also includes the center beam 18 described in FIG. 1, together with the forward and rear pivot points 18a and 18b. The row follower has a front pivot tube 23 and a rear pivot tube 24, both of which are similar in construction. Posts 26 extend downwardly from each end of the front and rear pivot tubes 23 and 24. A left bow rod set 27 of three shaped nylon rods is attached in the front and the rear by post attachment assemblies 28. In like fashion, a right bow rod set 29 of shaped nylon rods (mirror image to the left set) is attached to the opposing posts 26 by post attachment assemblies. Each post attachment assembly 28 has an attachment plate and a number of U-bolts 28a fixing the bow rod sets 27 and 29 to the posts 26. The forward direction for the rod follower assembly of FIG. 2 is in the direction of the arrow 31. The nylon rods in the bow rod sets 27 and 29 work to pinch the foliage in a vine row toward the center of the row follower. The rods function to guide the overhanging yoke to stay centered on the vine row as well as gathering and containing the foliage that grows upward from the vine cordon. The containment of the foliage achieves a clean cut of the wood in the vine during pruning. The bow rod sets also serve as mounting points for the restricted orifice nozzles that deliver the high pressure water jet stream to the trellised crop, as will be explained.

Figure 3:
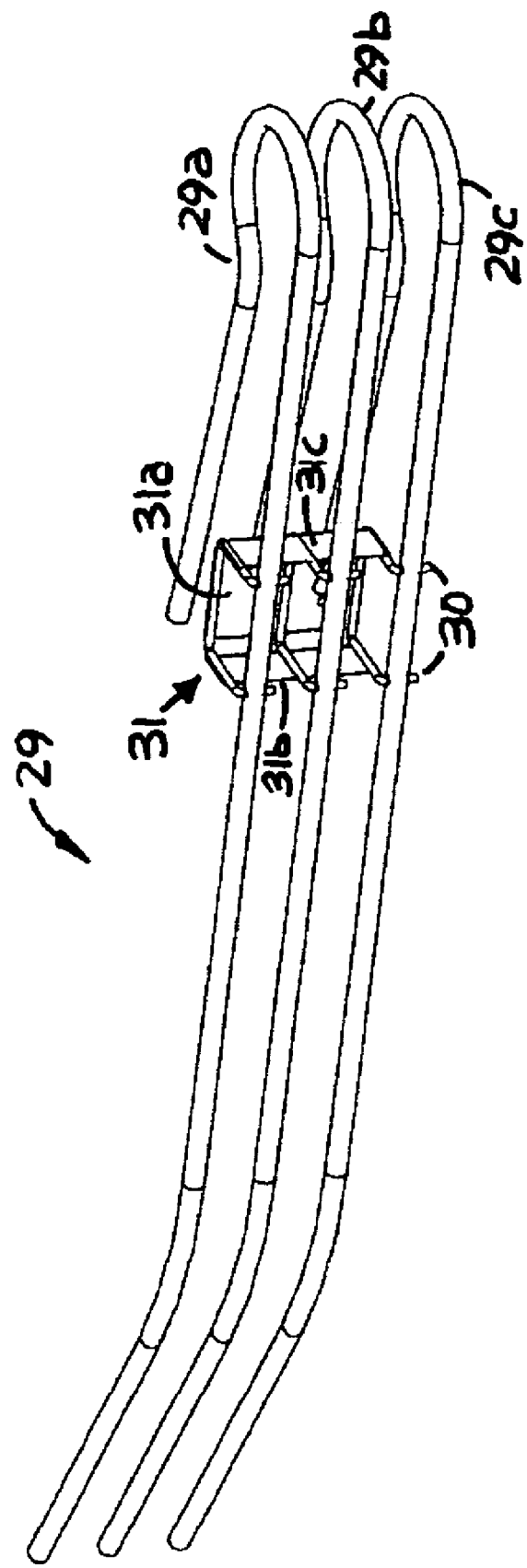
FIG. 3 is a perspective of a set of bow rods used in the row follower of FIG. 2.

FIG. 3 shows the bow rod set 29 as seen in FIG. 2 wherein a set of three nylon rods 29a, 29b and 29c are stacked one above the other. Between two of these rods a water jet nozzle is mounted on a fixture 31 attached to the rods so that the water jet is set back approximately ½ inch behind the vine contacting face of the rods. The water jet mount 31 has a back plate 31a and front and rear (relative to motion along a vine row) side plates 31b and 31c. Three angled pins typified at 30 in FIG. 3 pass through holes in each of the bow rods 29a, b and c to secure each of the front and rear side plates and thus the rod water jet mount 31 to the bow rod set. The distance between the front and back side plates 31b and 31c is greater in some instances, as will be hereinafter described, to afford placement of structure in front of the water jet to interrupt the jet stream for shoot thinning. It is necessary for the jet to remain close to the object it is cutting because the aperture in the jet may only be $10/1000$ths of an inch in diameter. The water jet will hold this diameter for only a few inches from the nozzle at the pressures required. Beyond that point the water jet rapidly spreads and pressure dissipates, losing cutting ability.

Figure 6:
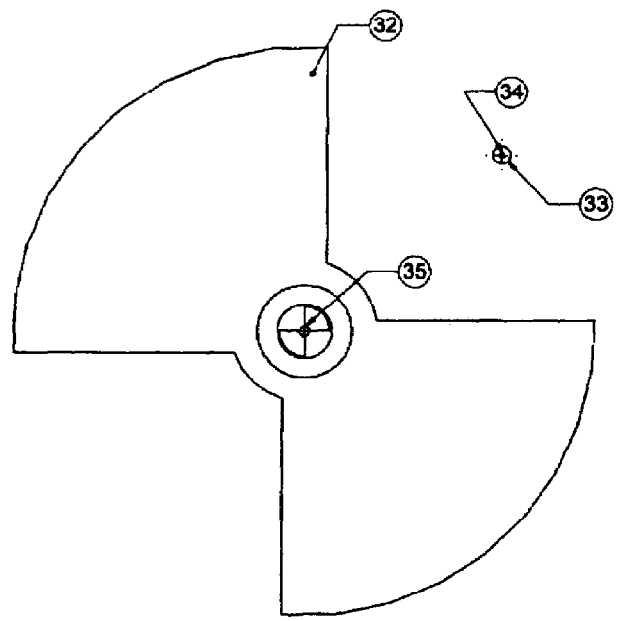
FIG. 6 depicts one type of rotating jet blockage plate used in shoot thinning.

Thinning of shoots from the vine, for the purpose hereinbefore described, utilizes much the same setup as used for pruning. Once the grower determines the percent of shoots to be removed from the vine for the required crop deduction, the nozzle on the water jet is mounted slightly further behind the face of the bow rod set away from the vine contact side of the rods. For example, instead of the nozzle being mounted ½ inch behind the face of the rods it may be mounted ¾ of an inch behind. In such an instance the manner in which the water jet is interrupted as the jet progresses along the length of the vine row may be affected by a round rotating disc such as that seen as item 32 in FIG. 6. When the disc 32 is utilized, the rod jet side plates 31b and 31c (FIG. 3) rotate about the central point 35 of the plate. The water jet nozzle 33 is shown in FIG. 6 having an aperture 34. The disc 32 is rotated at an RPM level such that, when combined with the speed of motion of the jet along the vine row, provides the desired percentage of vine shoot removal required. Other means of interrupting the water jet may be used, such as a continuous disc having semicircular slots in the disc aligned with the orifice 34 seen in FIG. 6. Additionally, if response allows, the water jet pressure may be controlled to produced shoot thinning pressures during portions of the travel along the vine row and less than shoot thinning pressures during the remainder of such travel. Thus, the interruption of the high pressure water jet may be obtained by blocking the jet or by jet pressure control.

Figure 4:
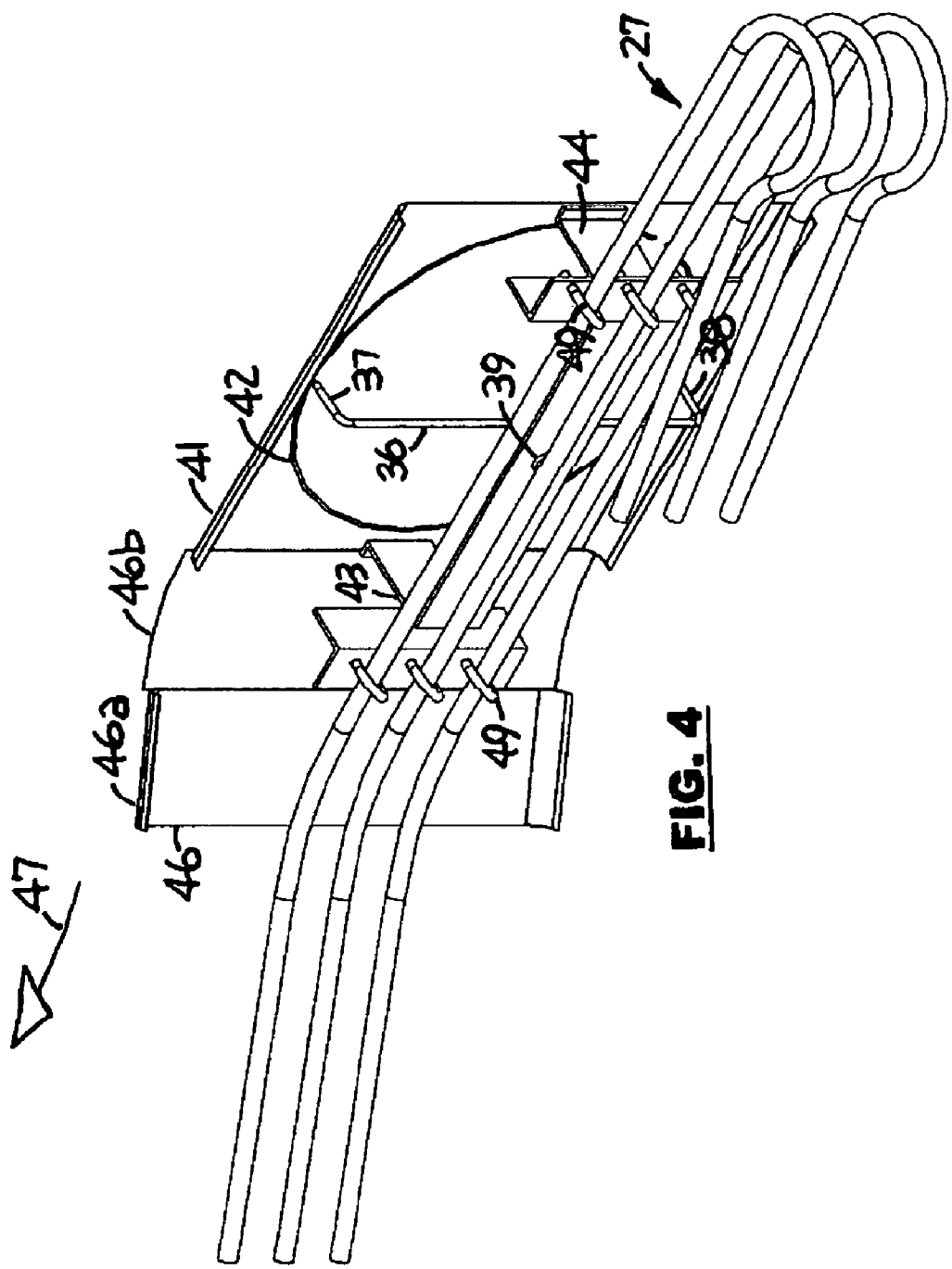
FIG. 4 is a perspective of a set of bow rods and nozzle assembly mounted for leaf thinning.

Leaf removal, for the purposes previously mentioned herein, use the same high water pressure cutting system previously described with some alteration in positioning of system components. The bow rod sets 27 and 29 (FIG. 2) are lowered to a position below the cordon, but take the same configuration on the pivoting yokes 11 and 12 as seen in FIG. 2. Bow rod set 27 is shown in FIG. 4 wherein the nozzle 33 is replaced by a spinner bar 36. The spinner bar has a first water jet 37 and an opposing water jet 38. The jets are angled slightly to produce rotation of the spinner bar 36 about a spin axis as the water is emitted from the nozzles 37 and 38. The jets 37 and 38 are fed through a swivel joint 39 on the spinner bar spin axis. The swivel joint is connected to the high pressure water flow. A shield 41 is positioned in front of the water jets 37 and 38 having a thin circular opening in the shield in alignment with the spinning travel of the water jets. Several narrow portions of the shield 41 bridge the opening 42 to maintain the integrity of the shield. The shield 41 is attached to the bow rod set 27 in FIG. 4 by fore and aft spin jet mounts 43 and 44, respectively. A shield deflector portion 46 has a forward portion 46a and a connecting portion 46b, wherein the forward portion tends to "gather" or compress the foliage and the connecting portion is capable of flexing to further lead the vine crop foliage between the bow rod sets as the assembly travels along the vine row. By way of clarification, the direction of travel of the assembly is indicated by the arrow 47 in FIG. 4. The leaf removal assembly is attached to the bow rod set 27 by means of U-bolts 49 contacting the fore and aft spin jet mounts 43 and 44, as also seen in FIG. 4.

In the leaf removal assembly described with reference to FIG. 4, the spinner bar 36 may be of any one of several lengths, but for description purposes herein 16 inches is an appropriate length. While the spinner bar may be self propelled, as just described, the rotation of the spinner bar 36 could be powered by several means such as hydraulically or pneumatically. Also, since the vine leaves have a thin cross section it takes lower water pressure to shred the leaves compared to the pressure required to cut the vine wood in pruning the vine. As the spinner bar spins and proceeds along the length of the vine row on the mobile carrier means such as the tractor 10 of FIG. 1, it will shred a "window" into the canopy of the vine as wide as the spinner bar is long. The flow rate of the water jet and the pressure imposed on the water jet will vary depending on the thickness of the vine canopy and the rate of speed of the mobile carrier along the vine row.

As may be seen from the foregoing, all three tasks of pruning, shoot thinning and leaf removal may be performed by the system of the present invention. The system described herein replaces tasks generally performed by hand labor different mechanical assemblies and provides a single system embracing minor mechanical modifications to perform three important but distinct tasks using substantially one system rather than three separate structures, one for each task.

Figure 7:
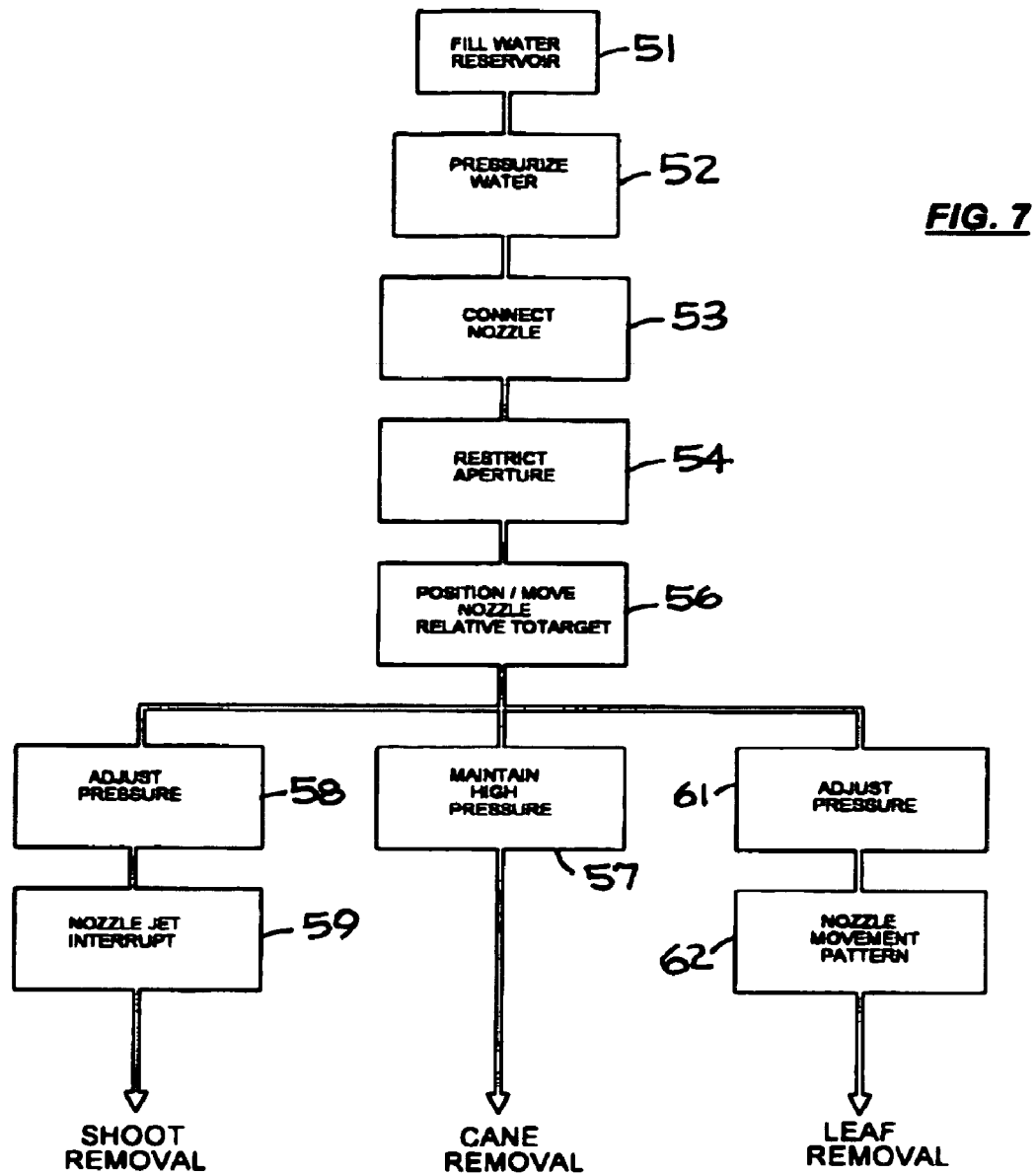
FIG. 7 is a flow chart depicting the processes for foliage treatment performed by the present invention.

Turning now to FIG. 7, the process of the present invention will be described. The water reservoir 15 is filled as seen in step 51 of FIG. 5. The high pressure pump 20 is connected to the water reservoir and the water is pressurized (step 52). The nozzle 33 is connected to a conduit from the high pressure pump (step 53) and the nozzle aperture is restricted to a predetermined size (step 54) depending on the distance the nozzle is positioned from the foliage to be treated and the level of pressure provided by the pump. The nozzle 33 is then positioned proximate to the crop (step 56) for motion relative to the crop to be treated. The position of the nozzle 33 relative to the foliage and the motion relative thereto depends on the process to be performed; cane, shoot or leaf removal. The next step in cane removal is maintenance of the high pressure from the nozzle restricted aperture and cutting of the cane wood as seen in step 57. Alternatively, for removal of shoots from the crop foliage, the pressure is adjusted (step 58) to obtain shoot removal and the water jet is interrupted either mechanically or by causing variation in the water jet stream (step 59) so shoots are removed from the foliage for only predetermined portions of travel of the system along the row. In the process involving leaf removal, the nozzle jet flow pressure is adjusted (step 61) and the nozzle is moved in a predetermined pattern (step 62) relative to the foliage to provide shattering of or removal of a portion of the crop leaves to allow more sunlight to impinge on the crop. The pressure adjustment in step 61 and the nozzle positioning in step 56 are interdependent for proper leaf thinning.

Although the best mode contemplated for carrying out the present invention has been shown and described herein, it will be understood that modification and variation may be made without departing from what is regarded to be the subject matter of the invention.

What is claimed:

1. A high pressure water jet foliage removal system for selectively pruning, shoot thinning and leaf thinning row grown crops, comprising
    a water reservoir,
    a high pressure pump connected to said water reservoir,
    a restricted orifice nozzle for providing a high pressure water jet,
    means for connecting said high pressure pump to said restricted orifice nozzle,
    a row follower for mounting said restricted orifice nozzle and for compressing the crop portion adjacent the restricted orifice nozzle,
    means attached to said row follower for adjusting said restricted orifice nozzle in predetermined position directed toward an adjacent portion of the growing crop, and
    means for controlling the impingement pressure of the high pressure jet on the compressed portion of the crop.

2. The high pressure water jet foliage removal system of claim 1, further comprising
    an additional restricted orifice nozzle in communication with said means for connecting,
    an additional row follower for mounting said additional restricted orifice nozzle and for compressing an additional portion of the growing crop adjacent said additional restricted orifice nozzle, and
    means attached to said additional row follower for adjusting said additional restricted orifice nozzle in predetermined position directed toward a position adjacent the additional portion of the growing crop.

3. The high pressure water jet foliage removal system of claim 1, wherein said restricted orifice nozzle has an orifice diameter within the range of 0.0025 to 0.050 inches.

4. The high pressure water jet foliage removal system of claim 1, wherein said high pressure pump provides a pressure at said restricted orifice nozzle of 10,000 to 40,000 psi.

5. The high pressure water jet foliage removal system of claim 1, wherein said restricted orifice nozzle comprises
    a movable restricted orifice nozzle traversing a pattern having a vertical range, and wherein said means for controlling comprises
    a shield disposed in front of said restricted orifice nozzle for protecting said movable nozzle from contact with the growing crop foliage, said shield having an opening therein corresponding to said movable nozzle pattern for passing a high pressure water jet therethrough.

6. The high pressure water jet foliage removal system of claim 1, wherein said means for adjusting comprises
    a mounting bracket for positioning said restricted orifice nozzle sufficiently proximate the compressed crop portion to prune crop branches.

7. The high pressure water jet foliage removal system of claim 1, wherein said means for adjusting comprises
    a mounting bracket for positioning said restricted orifice nozzle sufficiently proximate the compressed crop portion to effect shoot thinning, and wherein said means for controlling comprises
    means for periodically interrupting said high pressure water jet, whereby the compressed crop is subjected to shoot thinning.

8. The high pressure water jet foliage removal system of claim 1, wherein said means for adjusting comprises
    means for reciprocating said restricted orifice nozzle over a predetermined range, and wherein said means for controlling comprises
    means for reducing the pressure in said high pressure water jet.

9. A high pressure foliage removal system for selectively pruning, shoot thinning and leaf thinning row grown crops, comprising
    a mobile transport movable in a direction of travel along a crop row,
    a water reservoir on said mobile transport,
    a high pressure pump on said mobile transport connected to said water reservoir,
    a row follower attached to said mobile transport for compressing and containing opposing sides of the row grown crop and for guiding said row follower substantially along the centerline of the row grown crop,
    pivot means between said row follower and said mobile transport for providing pivotal motion of said row follower about an axis substantially parallel to said mobile transport direction of travel,
    crop,
    a restricted orifice nozzle,
    nozzle mounting means on said row follower for positioning said nozzle in predetermined spaced relationship with the row grown crop,
    a conduit connected between said high pressure pump and said restricted orifice nozzle, whereby high pressure water is delivered to said restricted orifice,
    means attached to said row follower for adjusting said restricted orifice nozzle in predetermined position directed toward an adjacent portion of the row grown crop, and
    means for controlling the impingement pressure of the high pressure jet on the compressed portion of the row grown crop.

10. The high pressure foliage removal system of claim 9, wherein said restricted orifice nozzle comprises
    a moving restricted orifice nozzle connected to said conduit and traversing a pattern having a limited vertical range, and wherein said means for controlling comprises
    a shield disposed in front of said restricted orifice nozzle for protecting said moving nozzle from contact with the row grown crop, said shield having an opening therein similar to said moving nozzle pattern for passing a high pressure water jet therethrough.

11. The high pressure foliage removal system of claim 10, wherein said pattern is circular and said shield opening is a substantially corresponding series of arcs.

12. The high pressure water jet foliage removal system of claim 9, wherein said means for adjusting comprises
    a mounting bracket for positioning said restricted orifice nozzle sufficiently proximate the compressed portion of the row grown crop to prune crop branches.

13. The high pressure water jet foliage removal system of claim 9, wherein said means for adjusting comprises
    a mounting bracket for positioning said restricted orifice nozzle sufficiently proximate the compressed portion of the row grown crop to effect shoot thinning, and wherein said means for controlling comprises means for periodically interrupting said high pressure water jet, whereby the compressed portion of the row grown crop is subjected to shoot thinning.

14. The high pressure water jet foliage removal system of claim 9, wherein said means for adjusting comprises means for reciprocating said restricted orifice nozzle over a predetermined range, and wherein said means for controlling comprises means for reducing the pressure in said high pressure water jet.

15. A method for selectively pruning, shoot thinning and leaf thinning foliage in a row growing crop comprising the steps of providing a source of water, pressurizing the water, connecting the pressurized water to a nozzle, restricting the nozzle aperture to provide a restricted high pressure stream, placing the nozzle in proximity to the foliage, directing the high pressure stream toward the foliage, compressing the foliage adjacent the nozzle, and moving the nozzle along the length of the row, controlling the impingement pressure of the high pressure stream on the compressed foliage.

16. The method of claim 15, wherein the step of restricting comprises restricting the nozzle aperture to within 0.0025 to 0.050 inches.

17. The method of claim 15, wherein the step of pressurizing comprises pressurizing the water to within 10,000 to 40,000 psi.

18. The method of claim 15, comprising the step of maintaining a high pressure stream from the nozzle during the step of moving for pruning the foliage.

19. The method of claim 15, comprising the step of interrupting the high pressure stream from the nozzle periodically during the step of moving to obtain shoot thinning.

20. The method of claim 15, comprising the steps of reducing pressure in the high pressure stream from the nozzle to obtain crop leaf removal, and displacing the nozzle in a predetermined two dimensional pattern during the step of moving to obtain leaf thinning.

* * * * *